United States Patent
Li et al.

(10) Patent No.: US 10,564,753 B2
(45) Date of Patent: Feb. 18, 2020

(54) COLOR FILTER SUBSTRATE, DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Ning Li, Beijing (CN); Xiaona Liu, Beijing (CN); Peng Jia, Beijing (CN); Chenchen Wu, Beijing (CN); Yuqiong Chen, Beijing (CN); Mengjie Wang, Beijing (CN); Shuai Yuan, Beijing (CN); Ziyi Zheng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/006,827

(22) Filed: Jun. 12, 2018

(65) Prior Publication Data
US 2019/0079617 A1    Mar. 14, 2019

(30) Foreign Application Priority Data
Sep. 8, 2017    (CN) .......................... 2017 1 0805502

(51) Int. Cl.
G06F 3/041 (2006.01)
G02F 1/1333 (2006.01)
G02F 1/1335 (2006.01)
G02F 1/1339 (2006.01)
G02F 1/1345 (2006.01)
G06F 3/044 (2006.01)

(52) U.S. Cl.
CPC ........ *G06F 3/0412* (2013.01); *G02F 1/13338* (2013.01); *G02F 1/13394* (2013.01); *G02F 1/13458* (2013.01); *G02F 1/133512* (2013.01); *G02F 1/133514* (2013.01); *G06F 3/044* (2013.01); *G02F 2001/13396* (2013.01); *G02F 2001/133519* (2013.01); *G06F 2203/04103* (2013.01); *G06F 2203/04111* (2013.01)

(58) Field of Classification Search
CPC combination set(s) only.
See application file for complete search history.

(56) References Cited

U.S. PATENT DOCUMENTS

2015/0331529 A1*   11/2015   Lee .................. G06F 3/044
                                                    345/174

* cited by examiner

*Primary Examiner* — Jennifer Mehmood
*Assistant Examiner* — Deeprose Subedi
(74) *Attorney, Agent, or Firm* — Kinney & Lange, P.A.

(57) ABSTRACT

A color filter substrate, a display panel and a display device are provided. The color filter substrate includes: a base substrate; a black matrix on a side of the base substrate; an insulation layer on a side of the black matrix away from the base substrate; and a touch routing line between the black matrix and the insulation layer, wherein an orthogonal projection of the black matrix on the base substrate covers an orthogonal projection of the touch routing line on the base substrate.

20 Claims, 2 Drawing Sheets

COLOR FILTER SUBSTRATE, DISPLAY PANEL AND DISPLAY DEVICE

CROSS-REFERENCE TO RELATED APPLICATION

This application claims the benefit of Chinese Patent Application No. 201710805502.5 filed on Sep. 8, 2017 in the State Intellectual Property Office of China, the whole disclosure of which is incorporated herein by reference.

TECHNICAL FIELD

The present disclosure relates to display technology, and more specifically, to a color filter substrate, a display panel and a display device.

BACKGROUND

At present, in the related art, in a pixel structure of touch and display driver integration display products (TDDI Top COM), touch routing lines for connecting touch electrodes often travel across blue (B) pixel regions on a thin film transistor (TFT) substrate.

SUMMARY

An embodiment of the present disclosure provides a color filter substrate including:
a base substrate;
a black matrix on a side of the base substrate;
an insulation layer on a side of the black matrix away from the base substrate; and
a touch routing line between the black matrix and the insulation layer,
wherein an orthogonal projection of the black matrix on the base substrate covers an orthogonal projection of the touch routing line on the base substrate.

In some embodiments, the color filter substrate further includes an electrically conductive contact pad on a side of the insulation layer away from the black matrix, and a via hole is arranged in the insulation layer, wherein the touch routing line is electrically connected to the electrically conductive contact pad through the via hole.

In some embodiments, the electrically conductive contact pad is arranged at an end of the via hole away from the touch routing line.

In some embodiments, an area of an orthogonal projection of the electrically conductive contact pad on the base substrate is greater than an area of an orthogonal projection of the via hole on the base substrate.

In some embodiments, the electrically conductive contact pad is made of metal.

In some embodiments, the via hole is filled with electrically conductive materials and the electrically conductive contact pad is formed by the electrically conductive materials in the via hole.

In some embodiments, a recess is arranged on the side of the insulation layer away from the black matrix and configured to accommodate the electrically conductive contact pad.

In some embodiments, the base substrate is a glass substrate.

In some embodiments, the color filter substrate further includes a color resist layer between the base substrate and the insulation layer.

In some embodiments, the insulation layer includes an overcoat layer.

An embodiment of the present disclosure also provides a display panel including the color filter substrate as described above.

In some embodiments, the display panel further includes an array substrate and at least one spacer between the array substrate and the color filter substrate, wherein the spacer is electrically conductive in a direction perpendicular to the color filter substrate and the array substrate such that the touch routing line in the color filter substrate is electrically connected to a common electrode on the array substrate through the spacer.

In some embodiments, the touch routing line is aligned with the spacer in the direction perpendicular to the color filter substrate.

In some embodiments, the color filter substrate further includes an electrically conductive contact pad on a side of the insulation layer away from the black matrix, and a via hole is arranged in the insulation layer, and the touch routing line is electrically connected to the electrically conductive contact pad through the via hole, and the electrically conductive contact pad contacts with the spacer.

In some embodiments, the electrically conductive contact pad has a first surface in contact with a second surface of the spacer, and an area of the first surface is smaller than or equal to an area of the second surface of the spacer.

In some embodiments, the at least one spacer includes a main spacer, a sub-spacer or both a main spacer and a sub-spacer.

In some embodiments, electrically conductive particles are arranged in the spacer, and the electrically conductive particles are electrically conductive in the direction perpendicular to the color filter substrate and the array substrate.

In some embodiments, the common electrode on the array substrate is led out to an integrated circuit.

An embodiment of the present disclosure also provides a display device including the display panel as described above.

BRIEF DESCRIPTION OF THE DRAWINGS

In order to explain the technical solutions of embodiments of the present disclosure, drawings used to describe the embodiments will be briefly introduced below. The following drawings only show some of embodiments in the present disclosure. The skilled person in the art may also obtain other drawings from these drawings without any creative efforts.

DETAILED DESCRIPTION

Embodiments of the present disclosure provide a color filter substrate, a display panel and a display device that may increase uniformity of display brightness of pixels and improve display effects of TDDI display products.

Structures of the color filter substrate provided by embodiments of the present disclosure will be firstly introduced below.

Figure 1:
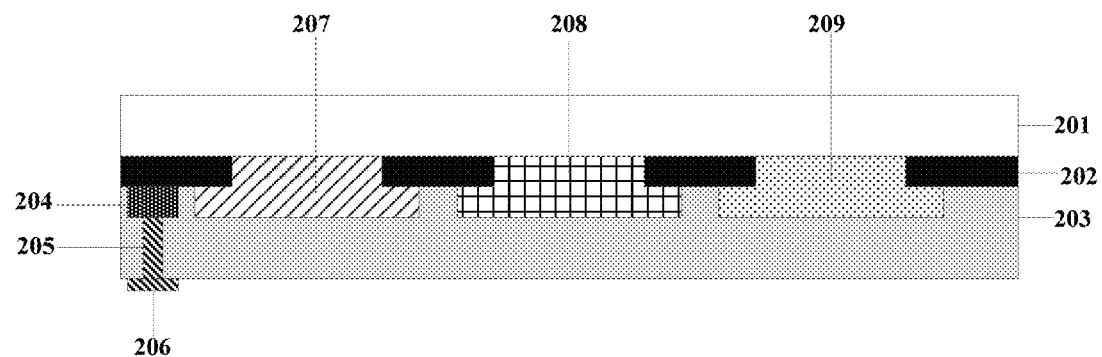
FIG. 1 is a schematic view showing a structure of a color filter substrate provided by an embodiment of the present disclosure.

As shown in FIG. 1, an embodiment of the present disclosure provides a color filter substrate. The color filter substrate includes a base substrate (for example a glass substrate, or called as a color filter glass) 201, a black matrix 202 on a side of the base substrate (below the base substrate 201 in FIG. 1) and an insulation layer (for example an overcoat layer (OC layer)) 203 on a side of the black matrix away from the base substrate (below the black matrix 202 in FIG. 1). The color filter substrate may further include: a touch routing line 204 between the black matrix 202 and the insulation layer 203 (below the black matrix 202 in FIG. 1). An orthogonal projection of the black matrix 202 on the base substrate (projection of the black matrix 202 in a direction perpendicular to the base substrate) covers an orthogonal projection of the touch routing line on the base substrate (projection of the touch routing line in a direction perpendicular to the base substrate).

In the embodiment of the present disclosure, the touch routing line 204 is arranged between the black matrix 202 and the insulation layer 203 (such as an overcoat layer). It may prevent the touch routing line from shielding light emitted from a display panel, so as to avoid degrading the light transmission of the display panel. It can prevent the touch routing line from being arranged on pixel areas, to avoid non-uniformity of display brightness of the pixel areas. Thus, the display uniformity of products and the display quality can be improved.

Figure 4:
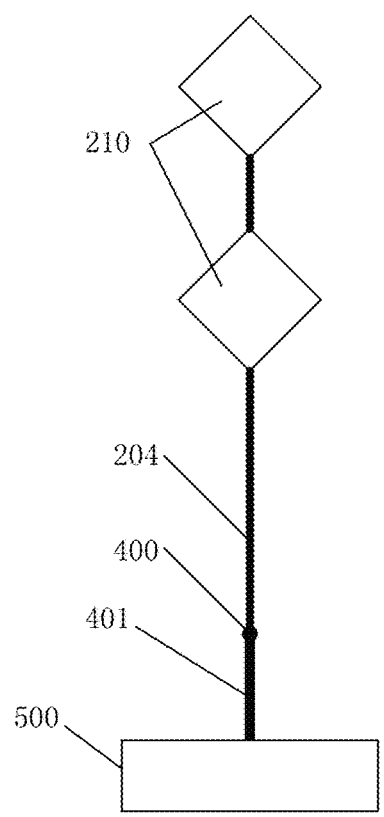
FIG. 4 is a schematic view showing connection of touch routing lines on the display panel.

As an example, the touch routing line 204 is used to connect touch electrodes 210, as shown in FIG. 4. For example, the touch electrodes 210 and the touch routing line 204 may be formed in the same layer. In an embodiment, the color filter substrate may further include an electrically conductive contact pad 206. The electrically conductive contact pad 206 may be arranged on a side of the insulation layer 203 away from the black matrix 202, and a via hole 205 may be further arranged in the insulation layer 203 (such as the overcoat layer). The touch routing line 204 is electrically connected to the electrically conductive contact pad 206 through the via hole 205. The electrically conductive contact pad 206 may for example be made from metal. The electrically conductive contact pad 206 may provide external electrical connection of the color filter substrate on the side of the color filter substrate away from the base substrate 201. For example, the electrically conductive contact pad 206 may provide electrical connection to a spacer 400. As an example, the electrically conductive contact pad 206 may be arranged at the via hole, for example, arranged at an end of the via hole 205 away from the touch routing line 204.

Figure 2:
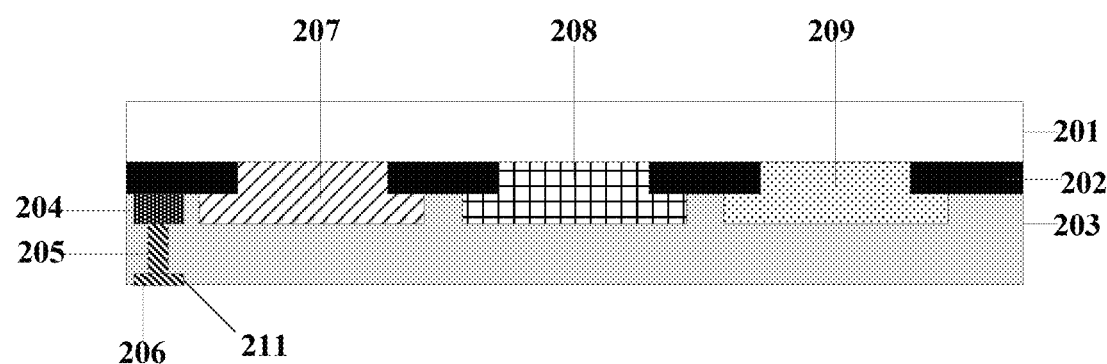
FIG. 2 is a schematic view showing a structure of another color filter substrate provided by an embodiment of the present disclosure.

It should be noted that the color filter substrate provided by the embodiment of the present disclosure may further include some other structures, such as color resist layers. As an example, as illustrated in FIG. 2, the color resist layers may include a red color resist layer 207, a green color resist layer 208 and a blue color resist layer 209. The red color resist layer 207, the green color resist layer 208 and the blue color resist layer 209 may correspond to a red sub-pixel area, a green sub-pixel area and a blue sub-pixel area on the display panel respectively. However, embodiments of the present disclosure are not limited to this. For example, the color filter substrate may further include more color resist layers with different colors, such as a yellow color resist layer. The black matrix 202 may be arranged among the color resist layers corresponding to the respective sub-pixel areas to shield a light. In this way, color mixture from the sub-pixel areas can be avoided and stray light can be shielded.

As an example, in an embodiment of the present disclosure, the via hole 205 in the insulation layer (such as the overcoat layer) 203 may be filled with electrically conductive materials (such as metal materials). The electrically conductive materials may be same to the materials of the electrically conductive contact pad 206. For example, the electrically conductive contact pad 206 may be formed by the electrically conductive materials in the via hole 205. As an example, the electrically conductive materials in the via hole 205 may also be same to the materials of the touch routing line 204 as long as it has the function of electrically connecting the touch routing line 204 with the electrically conductive contact pad 206.

Figure 3:
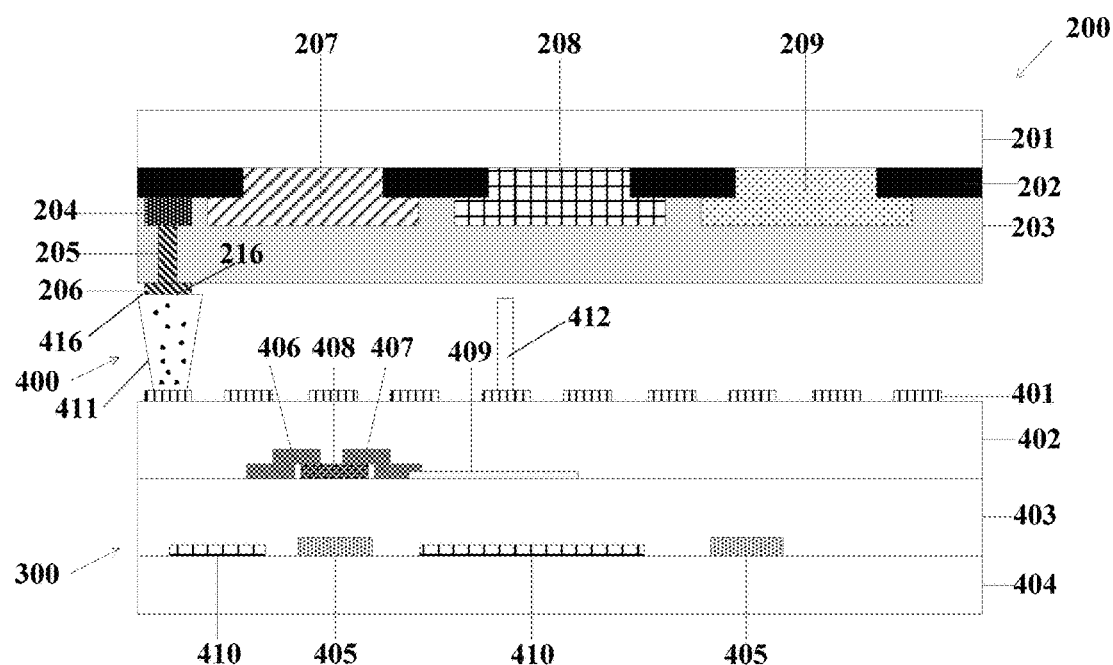
FIG. 3 is a schematic view showing a structure of a display panel provided by an embodiment of the present disclosure.

As an example, as shown in FIG. 1, the electrically conductive contact pad 206 may be arranged out of the via hole 205, that is, the electrically conductive contact pad 206 may be located outside of the insulation layer 203. Or, the electrically conductive contact pad 206 may be arranged in the insulation layer 203. For example, a recess 211 is arranged on the side of the insulation layer 203 away from the black matrix 202 and configured to accommodate the electrically conductive contact pad 206, as shown in FIG. 3. Provision of the recess 211 is advantageous in that the electrically conductive contact pad 206 is formed directly by the electrically conductive materials in the via hole 205.

In an embodiment of the present disclosure, the via hole 205 may be of a regular shape of cylinder, or may be of an irregular shape. The electrically conductive material (such metal) in the via hole 205 may be used to form the electrically conductive contact pad 206 directly.

In an embodiment, an area of an orthogonal projection of the electrically conductive contact pad 206 on the base substrate 201 is greater than an area of an orthogonal projection of the via hole 205 on the base substrate. In particular, in the embodiments shown in FIG. 2 and FIG. 3, a cross sectional area of the electrically conductive contact pad 206 is greater than a cross sectional area of the via hole 205. When the color filter substrate is used in the display panel, such arrangement can increase contact area between the electrically conductive contact pad 206 and the spacer 400, so as to ensure better electrical connection of the touch routing line 204 and the spacer 400.

The display panel provided by the embodiment of the present disclosure will be described below.

As seen in FIG. 3, an embodiment of the present disclosure provides a display panel including the color filter substrate as described above.

In an embodiment, the display panel may further include an array substrate 300 opposite to the color filter substrate 200 and at least one spacer 400 between the array substrate 300 and the color filter substrate 200. The spacer 400 is electrically conductive in a direction perpendicular to the color filter substrate 200 and the array substrate 300 such that the touch routing line 204 in the color filter substrate 200 is electrically connected to a common electrode 401 on the array substrate 300 through the spacer 400.

By means of the spacer 400, the touch routing line 204 in the color filter substrate 200 can be electrically connected to the common electrode 401 in the array substrate 300, so as to supply power to the touch electrodes conveniently.

In an embodiment, when the color filter substrate includes the electrically conductive contact pad 206, the electrically conductive contact pad 206 may be on the side of the insulation layer 203 away from the black matrix 202, and a via hole 205 is arranged in the insulation layer 203, and the touch routing line 204 is electrically connected to the electrically conductive contact pad 206 through the via hole 205, and the electrically conductive contact pad 206 contacts with the spacer 400. Thus, it may achieve electrical connection between the touch routing line 204 in the color filter substrate 200 and the spacer 400.

As an example, the electrically conductive contact pad 206 may have a first surface (for example, a lower surface of the electrically conductive contact pad 206 shown in FIG. 3) 216 in contact with a second surface (for example, an upper surface of the spacer 400 shown in FIG. 3) 416 of the spacer 400. An area of the first surface 216 is smaller than or equal to an area of the second surface 416 of the spacer 400. It may keep the first surface 216 of the electrically conductive contact pad 206 in contact with the spacer 400 completely. As an example, the first surface 216 and the second surface 416 may both be parallel to a surface of the base substrate 201 of the color filter substrate.

However, embodiments of the present disclosure are not limited to this. For example, the area of the first surface 216 of the electrically conductive contact pad 206 may also be greater than or equal to the area of the second surface 416 of the spacer 400.

In an embodiment, the touch routing line 204 is aligned with the spacer 400 in a direction perpendicular to the base substrate 201 of the color filter substrate. It can reduce a length of connection path between the touch routing line 204 and the spacer 400 as far as possible, for example, reduce the length of the via hole 205.

In an alternative embodiment, as shown in FIG. 3, the touch routing line 204 may be arranged below the black matrix and aligned with the spacer 400. Thus, the touch routing line 204 may be electrically connected to the common electrode 401 on the array substrate 300 via the spacer 400.

It should be noted that, in the embodiments shown in FIG. 1 to FIG. 3, the touch routing line 204 is arranged below the black matrix 202 adjacent to the red color resist layer 207, however, the touch routing line 204 may also be arranged on the side of the black matrix 202 adjacent to the other color resist layer facing towards the insulation layer 203 (for example, below the black matrix 202 adjacent to the other color resist layer), for example, may alternatively be arranged on the side of the black matrix 202 adjacent to the blue color resist layer 209 facing towards the insulation layer 203 (for example, below the black matrix 202 adjacent to the blue color resist layer 209).

In an embodiment of the present disclosure, the at least one spacer 400 may include a main spacer 411, a sub-spacer 412 or both a main spacer 411 and a sub-spacer 412. In a liquid crystal display panel, liquid crystal is charged into a space between the color filter substrate and the array substrate and spacers are provided between the color filter substrate and the array substrate for supporting function. In the spacers, the main spacer is relatively high and the sub-spacer is relatively low. When both the main spacer and the sub-spacer are provided, there is height difference between the main spacer and the sub-spacer. When no forces are applied to a screen of the display panel, the supporting function is achieved by the main spacer, and when the screen of the display panel is pressed by an external force, the main spacer and the sub-spacer together provide the supporting function. The height difference between the main spacer and the sub-spacer can permit the display panel to have a certain deformation to buffer the external force.

For example, if the touch routing line 204 is arranged below the black matrix 202 facing the main spacer 411, the touch routing line 204 may be electrically connected to the common electrode 401 on the array substrate 300 directly by the main spacer 411. If the touch routing line 204 is arranged below the black matrix 202 facing the sub-spacer 412, the touch routing line 204 may be electrically connected to the common electrode 401 on the array substrate 300 by the sub-spacer 412 when the screen of the display panel is pressed. If the touch routing lines 204 are arranged both below the black matrix 202 facing the main spacer 411 and below the black matrix 202 facing the sub-spacer 412 (on the side of the black matrix 202 towards the array substrate), the touch sensitivity of products can be further increased.

As an example, electrically conductive particles may be arranged in the spacer 400, and the electrically conductive particles are electrically conductive in the direction perpendicular to the color filter substrate 200 and the array substrate 300. In this way, the touch routing line 204 in the color filter substrate 200 may be electrically connected to the common electrode 401 on the array substrate 300 by the spacer 400.

In the embodiment of the present disclosure, the array substrate 300 may be in a known form. As seen in FIG. 3, for example, the array substrate may include a glass substrate 404, a gate line 405, a pixel electrode 410, a gate insulation (GI) layer 403, a passivation (PVX) layer 402, a gate electrode 408, a source electrode 406, a drain electrode 407, a data line 409, and the like.

As an example, the common electrode 401 on the array substrate 300 may be led out to an integrated circuit 500, as shown in FIG. 4. FIG. 4 shows schematically an example of connection of the touch routing line 204 with the touch electrodes 210, the common electrode 401 on the array substrate and the integrated circuit 500. For the sake of clarity, some components such as the black matrix, the color resist layer or the like, have been omitted in FIG. 4.

An embodiment of the present disclosure provides a display device including the display panel as described in any one of the above embodiments of the present disclosure.

The technical solutions provided by the embodiments of the present disclosure may be applied in various liquid crystal display panels. For example, a touch display device is an self-capacitance In-Cell structure with HADS (High Aperture Advanced Super Dimension Switch) display mode. The touch electrodes share the common electrode (Com) ITO on the TFT substrate. A layer of metal line may be produced on the black matrix (BM) layer on the color filter (CF) substrate, as the touch routing line. The routing line is connected to the touch electrodes and led out to the integrated circuit (IC). A hole is formed in the overcoat layer (OC layer) on the CF substrate and a metal contact pad is produced at the hole such that the metal contact pad is electrically connected to the routing line. Anisotropic electrically conductive particles are added into the spacer. The electrically conductive particles may be electrically conductive in a direction perpendicular to the CF substrate and the array substrate. One end of the spacer is in contact with the COM touch electrodes on the TFT substrate and the other end of the spacer is in contact with the metal contact pad on the CF substrate, such that the routing line is electrically connected to the touch electrodes and is electrically connected to the IC via the touch electrodes. As an example, at the IC, the display and touch operations are controlled in time division. In the normal display period, the touch electrodes are supplied with the common electrode (COM) signal, and in the touch period, the touch electrodes sense finger touch signal. The display device provided by the embodiment of the present disclosure may be a user device, for example, in particular may be a desktop computer, a portable computer, a smart phone, a tablet computer, a personal digital assistant (PDA), or the like. The computer device may include a center processing unit (CPU), a memory, an input/output device, or the like. The input device may include a keyboard, a mouse, a touch screen or the like. The output device may include a display device, such as a liquid crystal display (LCD), a cathode ray tube (CRT), or the like.

The memory may include a read-only memory (ROM) and a random access memory (RAM), and supply program instructions and data stored in the memory into a processor. The memory may be any medium or data storing devices that are readable by the computer, including but not limited to magnetic memory (for example, floppy disk, hard disk, magnetic tape, magnetic optical disk (MO), or the like), optical memory (such as CD, DVD, BD, HVD, or the like) and semiconductor memory (for example, ROM, EPROM, EEPROM, nonvolatile memory (NAND FLASH), solid state disk (SSD)), or the like.

Those skilled in the art can make various modifications and variations on the present disclosure without departing from the spirit and scope of the present disclosure. Thus, these modifications and variations of the present disclosure are incorporated into the present disclosure if they fall within the scope of the appended claims and equivalents thereof.

What is claimed is:

1. A color filter substrate comprising:
a base substrate;
a black matrix on a side of the base substrate;
an insulation layer on a side of the black matrix away from the base substrate;
a touch routing line between the black matrix and the insulation layer;
an electrically conductive contact pad on a side of the insulation layer away from the black matrix, the electrically conductive contact pad directly contacting with a spacer between an array substrate and the color filter substrate; and
a via hole arranged in the insulation layer,
wherein an orthogonal projection of the black matrix on the base substrate covers an orthogonal projection of the touch routing line on the base substrate, and the touch routing line is electrically connected to the electrically conductive contact pad through the via hole, and
wherein an area of an orthogonal projection of the electrically conductive contact pad on the base substrate is greater than an area of an orthogonal projection of the via hole on the base substrate.

2. The color filter substrate according to claim 1, wherein the electrically conductive contact pad is arranged at an end of the via hole away from the touch routing line.

3. The color filter substrate according to claim 1, wherein the electrically conductive contact pad is made of metal.

4. The color filter substrate according to claim 1, wherein the via hole is filled with electrically conductive materials and the electrically conductive contact pad is formed by the electrically conductive materials in the via hole.

5. The color filter substrate according to claim 1, wherein a recess is arranged on the side of the insulation layer away from the black matrix and is configured to accommodate the electrically conductive contact pad.

6. The color filter substrate according to claim 1, wherein the base substrate is a glass substrate.

7. The color filter substrate according to claim 1, further comprising a color resist layer between the base substrate and the insulation layer.

8. The color filter substrate according to claim 1, wherein the insulation layer comprises an overcoat layer.

9. A display panel comprising the color filter substrate according to claim 1.

10. A display panel comprising:
a color filter substrate, an array substrate and at least one spacer between the array substrate and the color filter substrate,
wherein the color filter substrate comprises:
a base substrate;
a black matrix on a side of the base substrate;
an insulation layer on a side of the black matrix away from the base substrate; and
a touch routing line between the black matrix and the insulation layer,
wherein an orthogonal projection of the black matrix on the base substrate covers an orthogonal projection of the touch routing line on the base substrate, and
wherein the spacer is electrically conductive in a direction perpendicular to the color filter substrate and the array substrate such that the touch routing line in the color filter substrate is electrically connected to a common electrode on the array substrate through the spacer.

11. The display panel according to claim 10, wherein the touch routing line is aligned with the spacer in the direction perpendicular to the color filter substrate.

12. The display panel according to claim 10, wherein the color filter substrate further comprises an electrically conductive contact pad on a side of the insulation layer away from the black matrix, and a via hole arranged in the insulation layer, wherein the touch routing line is electrically connected to the electrically conductive contact pad through the via hole, and the electrically conductive contact pad directly contacts with the spacer.

13. The display panel according to claim 12, wherein the electrically conductive contact pad has a first surface in contact with a second surface of the spacer, and an area of the first surface is smaller than or equal to an area of the second surface of the spacer.

14. The display panel according to claim 10, wherein the at least one spacer comprises a main spacer, a sub-spacer, or both a main spacer and a sub-spacer, the main spacer having a larger height than the sub-spacer.

15. The display panel according to claim 10, wherein electrically conductive particles are arranged in the spacer, and the electrically conductive particles are electrically conductive in the direction perpendicular to the color filter substrate and the array substrate.

16. The display panel according to claim 10, wherein the common electrode on the array substrate leads out to an integrated circuit.

17. A display device comprising the display panel according to claim 9.

18. A display device comprising the display panel according to claim 10.

19. The color filter substrate according to claim 1, wherein an orthogonal projection of the black matrix on the base substrate covers an orthogonal projection of the electrically conductive contact pad on the base substrate.

20. The color filter substrate according to claim 1, wherein an orthogonal projection of the electrically conductive contact pad on the base substrate covers an orthogonal projection of the via hole on the base substrate.

\* \* \* \* \*